United States Patent [19]

Torres

[11] 4,202,602
[45] May 13, 1980

[54] MULTI-ANGULAR RADIANT ENERGY MODULATOR

[76] Inventor: Ismael Torres, 1800 Piedmont St., Oxnard, Calif. 93030

[21] Appl. No.: 421,014

[22] Filed: Dec. 3, 1973

[51] Int. Cl.² .................. G05D 25/00; F01B 25/02
[52] U.S. Cl. ........................ 350/272; 335/11; 335/159; 350/269; 415/155; 250/232; 455/608
[58] Field of Search ........... 350/266, 269, 272; 250/232, 199; 331/94.5 M; 332/7.51; 335/11, 159; 415/155; 235/201 ME

[56] References Cited

U.S. PATENT DOCUMENTS

| 2,414,472 | 1/1947 | Loughridge | 335/159 |
| 2,666,650 | 1/1954 | MacDonell | 274/27 |
| 2,777,915 | 1/1957 | Hussey | 335/159 |
| 2,876,292 | 3/1959 | Callender et al. | 335/159 |
| 3,809,477 | 5/1974 | Russell | 356/141 |

*Primary Examiner*—S. C. Buczinski
*Attorney, Agent, or Firm*—Richard S. Sciascia; Joseph M. St. Amand

[57] ABSTRACT

A radiant energy source modulator comprising a plurality of electro-mechanical drivers which operate individually to close an aperture through which radiant energy from an infrared laser light, etc., source must pass. Excitation of each of said drivers with separate desired input signals operates to obstruct or permit the radiant energy to pass through the aperture, the overall radiant energy which passes being modulated by the plurality of drivers.

7 Claims, 16 Drawing Figures

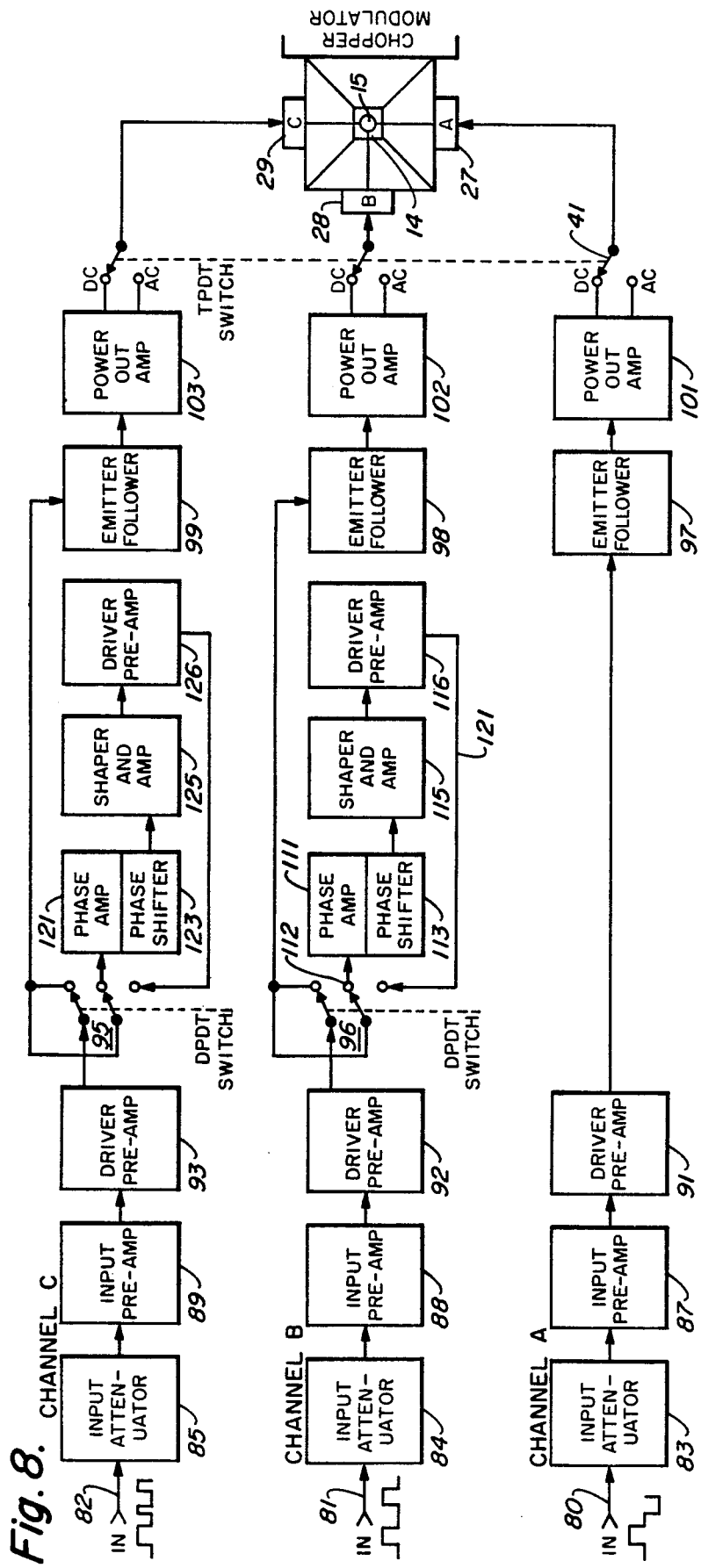
Fig.8.
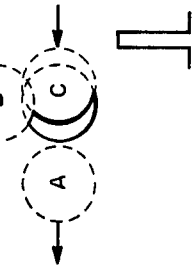
Fig.9e
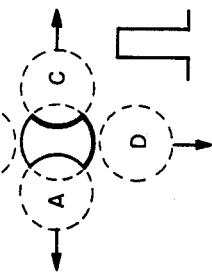
Fig.9d
Fig.9c
Fig.9b
Fig.9a
ARROWS POINT TO
PULSE EXCITATION ature such that the radiant energy at the output is in modulated form. The frequency of the output radiant energy can be changed merely by means of a control knob, and the device can be constructed and programmed to produce any desired pulse and pulse width. The flexibility to produce pulse change in amplitude and width is an important and unique feature of the present device, since no prior type radiant energy modulator device has these features. Also, the very low mass and inertias encountered in the present invention permits a very rapid change in output with a rapid change of input frequency. Further, the number of inputs that can be fed to the device simultaneously are practically unlimited. Size and weight of the device is also very flexible.

MULTI-ANGULAR RADIANT ENERGY MODULATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

This invention is related to electro-mechanical modulators and particularly to a modulator for a radiant energy source. The general purpose of the invention is to provide a modulator for such radiant energy sources as lasers, infrared, ultraviolet, white light, etc., and having all of the advantages and none of the disadvantages of presently available choppers and modulators. The instant invention also provides a working tool for electronic laboratories doing research in the fields of lasers, ultraviolet and infrared radiation, etc.

There are presently many types of electro-mechanical modulators and choppers in the prior art. All these choppers ordinarily use vanes or rotary devices to chop a source of energy. These prior type choppers and rotary devices have a number of limitations which are overcome by the present invention.

Several choppers use a tuning fork principle to do the chopping. The tuning fork is usually excited by an electro-mechanical device such as a solenoid and maintained at its resonant frequency by keeping current flowing through the solenoid.

A limitation to these devices is the inability to change their rates of vibration (frequency), requiring the whole mechanism to be changed to change frequency. The size and frequency rates are greatly limited. There are very few tuning fork choppers that can chop lower than 10 hertz per second.

Rotary type choppers use wheels with notches cut in them for chopping the source, usually a motor and a motor controlling device is used in these to drive the chopper wheels. To change the frequency of a rotary chopper, either the speed of the motor, the wheel, or the number of notches in the wheel must be changed. All such changes consume valuable time when making multiple tests.

In both the rotary type of chopper and the tuning device type of chopper involving the fluttering vane type, there is a great deal of mass that has to be overcome, and a frequency change is a relatively slow process.

There are solid state, crystal type choppers or so-called modulators. In most cases, the crystal type chopper has to be resonated at the natural resonance of the crystal, usually above 100 Kc; therefore, placing a limitation on these type devices as far as the lower frequencies are concerned. If lower frequencies are desired, associated complex electronics circuitry is required with the device which often necessitates repairs and calibrations.

SUMMARY OF THE INVENTION

The present invention involves an electro-mechanical modulator for radiant energy comprising a plurality of electro-mechanical drivers which operate like valves to open or close respective individual apertures through which radiant energy from a laser source, for example, must pass. Separate excitation of each of the aperture drivers with desired input signals operates to obstruct or permit the radiant energy to pass through the aperture such that the radiant energy at the output is in modulated form. The frequency of the output radiant energy can be changed merely by means of a control knob, and the device can be constructed and programmed to produce any desired pulse and pulse width. The flexibility to produce pulse change in amplitude and width is an important and unique feature of the present device, since no prior type radiant energy modulator device has these features. Also, the very low mass and inertias encountered in the present invention permits a very rapid change in output with a rapid change of input frequency. Further, the number of inputs that can be fed to the device simultaneously are practically unlimited. Size and weight of the device is also very flexible.

It is an object of the invention, therefore, to provide a new and improved electro-mechanical radiant energy modulator.

It is also an object of the invention to provide a laser beam modulator.

Another object of the invention is to provide a radiant energy modulator device for modulating both in amplitude and width.

A further object of the invention is to provide a radiant energy modulator operable from very low to extremely high frequencies.

Other objects, advantages and novel features of the invention will become apparent from the following detailed description of the invention when considered in conjunction with the accompanying drawings.

BRIEF DESCRIPTION OF THE DRAWINGS

FIG. 8 is a circuit block diagram showing one embodiment for exciting the solenoid drivers shown in the embodiment of FIG. 1.

FIGS. 9 (a–e) are graphic illustrations used for showing various type radiant energy pulses produced from three and four modulation apertures.

DETAILED DESCRIPTION OF THE PREFERRED EMBODIMENT

Figure 1:
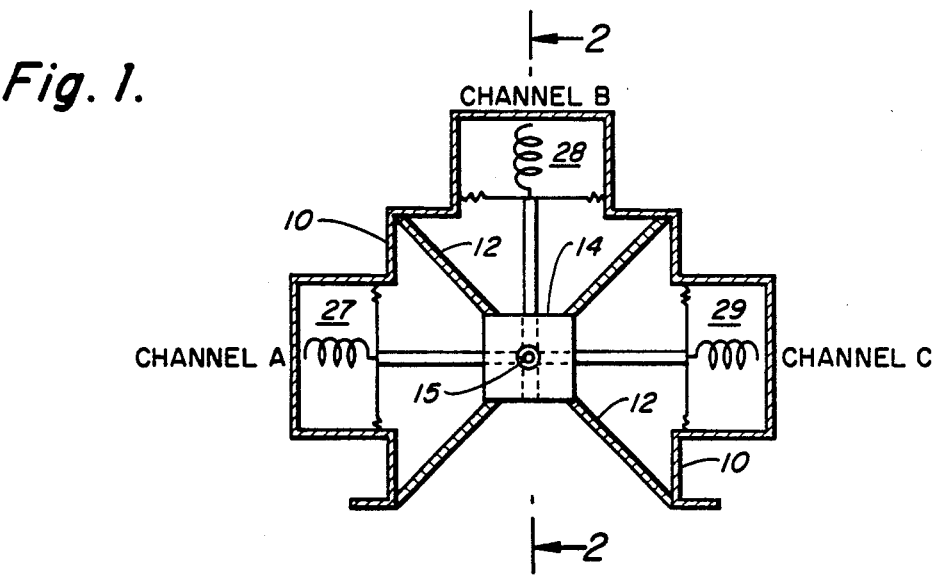
FIG. 1 is a cross-sectional view of one embodiment of the invention looking in the axial direction and showing three channels of modulation.
Figure 2:
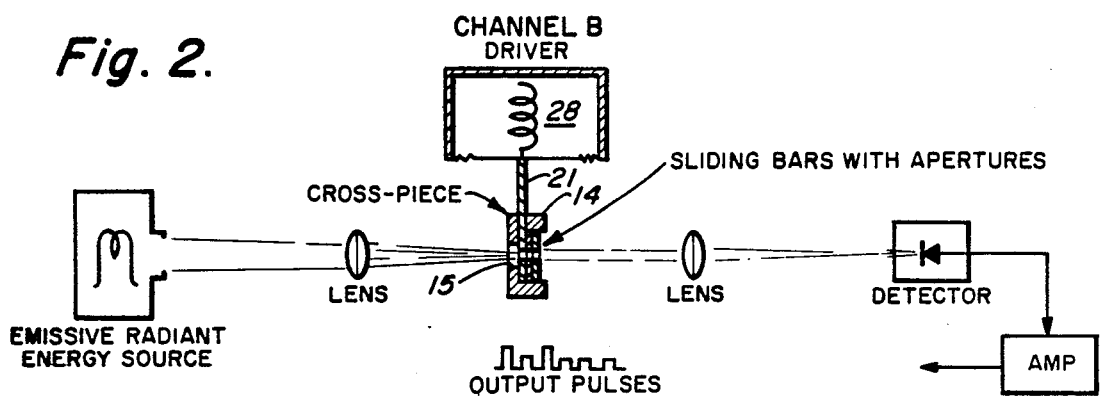
FIG. 2 is a schematic diagram of the invention showing the embodiment of FIG. 1 taken along line 2—2, and including detection and amplifying circuitry.
Figure 3:
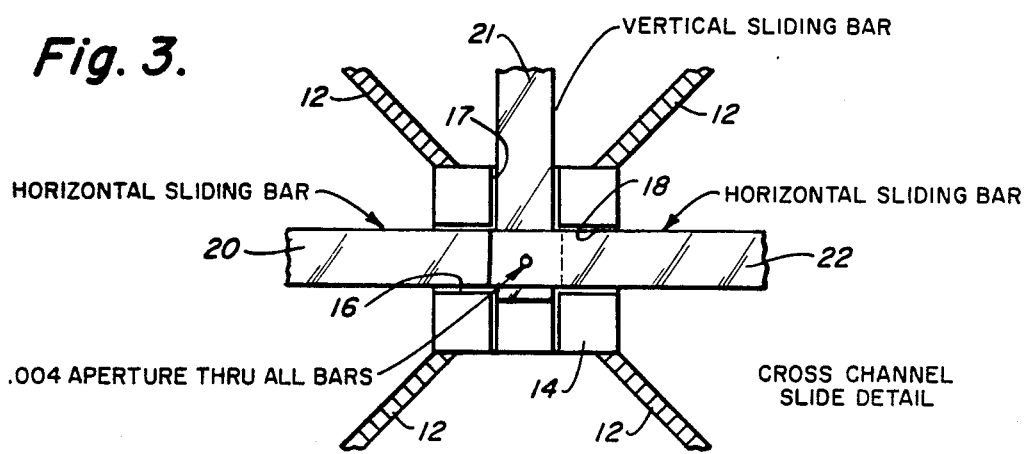
FIG. 3 shows a rear view of the cross channel sliding bars detail of the embodiment illustrated in FIG. 1.

The modulator as illustrated in FIGS. 1, 2 and 3 comprises a main frame structure 10, for example, having welded center cross-bracing 12 for strength and stability. A cross piece 14 mounted at the center of the cross-bracing has three milled channels 16, 17 and 18, each channel 90° apart about a large central aperture 15. Channels 16, 17 and 18 accommodate sliding bars 20, 21 and 22, respectively; each bar being slidingly independent of each other. Sliding bars 20, 21 and 22 each have a small aperture 23, 24 and 25, respectively, therein (0.004" in diameter, for example), normally aligned with each other at the center of large aperture 15 in cross piece 14. Three electro-mechanical driving devices 27, 28 and 29, for example, for operating Channels A, B and C, respectively, of the modulator chopper are mounted about frame 10 for driving sliding bars 20, 21 and 22, respectively. As shown in the drawings, drivers 27, 28 and 29 are attached to the main frame 10 at right angles to each other and the center of apertures 15, 23, 24 and 25 in the energy flow path are normally aligned exactly with one another. Any number of sliding bars with apertures and drivers may be positioned about large aperture 15 in cross piece 14, as desired, to suit a particular situation. The size of large aperture 15 and apertures 23, 24 and 25 can be varied. However, large aperture 15 should have a diameter at least twice that of apertures 23, 24 and 25.

When the modulator is not being excited, i.e., signals are not being applied to any of drivers 27, 28 and 29, sliding bars 20, 21 and 22 are at rest and all the apertures are aligned like fully opened valves, permitting light to pass through all the apertures.

The operation of the drivers and apertures can best be described by means of FIGS. 4 through 7. For simplification, Channel-B is omitted.

Figure 4:
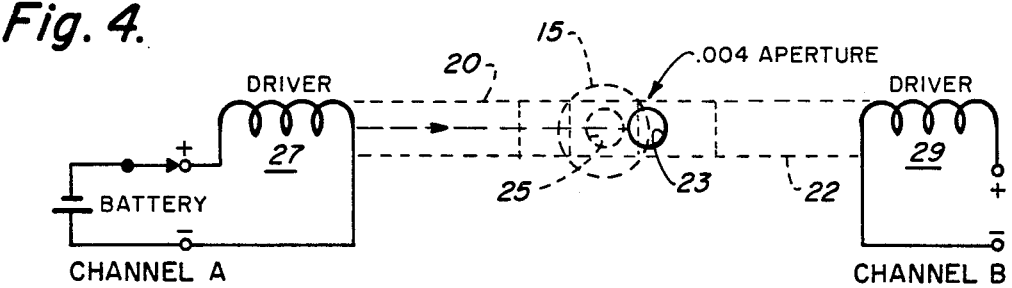
FIGS. 4 through 7 are graphic illustrations used to explain the movement of the apertures in two channels of the modulator for various exitation.

When a positive voltage is applied to driver 27 of Channel-A, see FIG. 4, sliding bar 20 is moved in the direction of the arrow such that hole 23 therein is not aligned with hole 25 in sliding bar 22 and the modulator is thus in a closed position for the duration of the applied voltage, acting as a closed valve, preventing radiation from passing through aperture 15 in the modulator. As shown in FIG. 4, driver 29 of Channel-C is not energized and, therefore, aperture 25 in sliding bar 22 remains in alignment with aperture 15.

Figure 5:
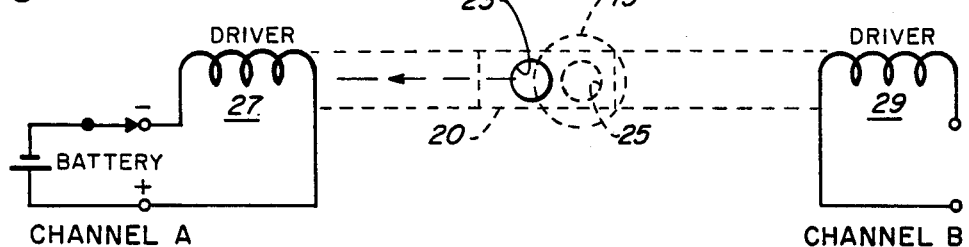

In FIG. 5, when a negative voltage is applied to driver 27, sliding bar 20 is moved in the opposite direction than shown in FIG. 4, and hole 23 in pulled out of alignment with aperture 25, and the modulator is again in a closed position for the duration of the applied voltage. In FIG. 5, driver 26 of Channel-C is not energized.

Figure 6:
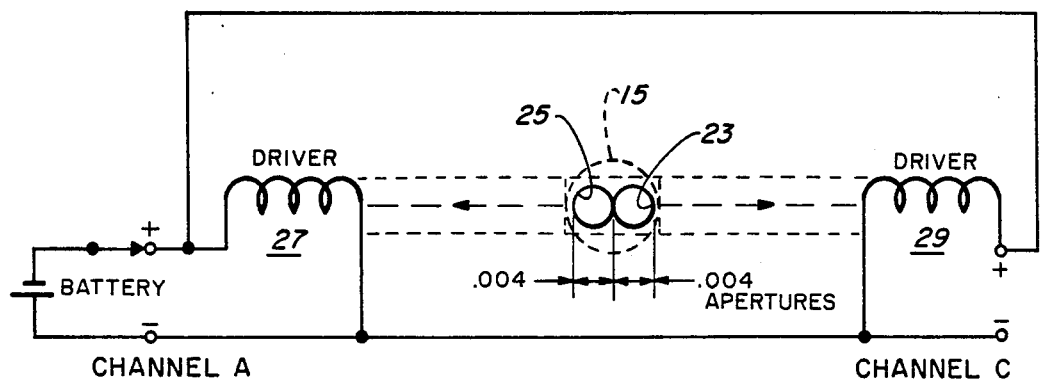

When driver 27 of Channel A receives a positive voltage signal, as illustrated in FIG. 6, bar 20 with aperture 23 is moved away from driver 27, for example, by the maximum excursion allowed of 0.004". If, at the same instant, the same positive pulse is applied to driver 29 of Channel C, driver 29 will push bar 22 with aperture 25 away from itself by the maximum 0.004". The resultant pulse has the apparent effect of stretching the aperture to 0.008". Therefore, the modulator would take twice as long to return to its original neutral position. The pulse as seen by the detector, in FIG. 2, would be twice the width as the original pulse; however, the frequency of the pulse will remain the same. This is an "in phase" condition. These explanations and simplified illustrations are for the purpose of describing the principles of operation of the chopper/modulator of this invention.

Figure 7:
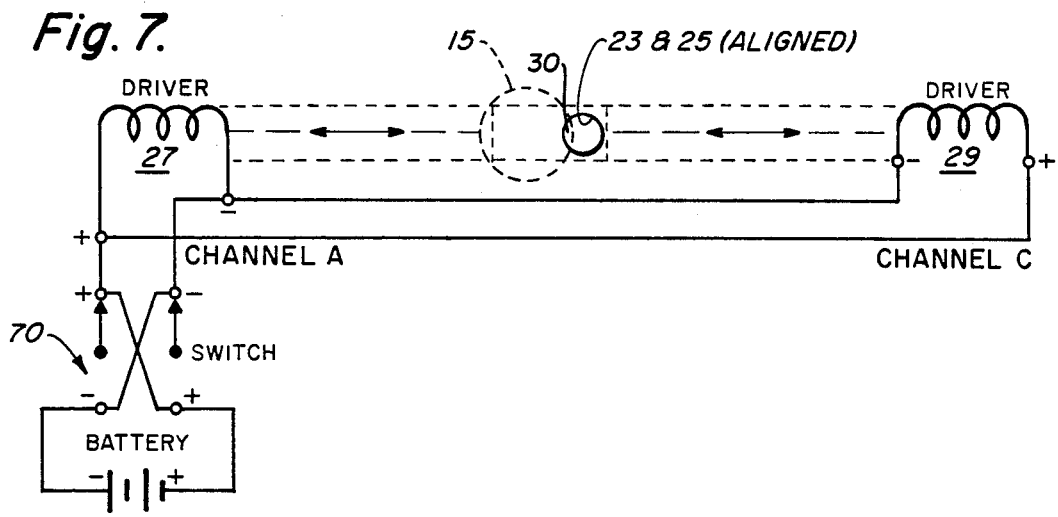

In FIG. 7, when driver 27 is provided a positive going pulse, it will push aperture 23 away by 0.004" while, at the same time, a negative going pulse applied to driver 29 will pull its aperture toward itself by 0.004". The resultant pulse effect is the same as if only one driver was being driven instead of the two.

As shown in FIG. 7, apertures 23 and 25 are aligned with each other but not entirely within central aperture 15 and thus in such a position the flow of energy through the modulator is greatly reduced since only the small overlapping portion 30 of aligned apertures 23 and 25 with central aperture 15 will permit any passage of energy.

If switch 70, FIG. 7, is switched into reverse, the effect on the driver 27 and 29 will be in reverse and the pulse shape will be the same. The device is electromechanical and the drivers should be dampened to reduce mechanical oscillations; the electronic circuits apply proper pulse shapes to the drivers for linear driving.

Referring to the block diagram of FIG. 8, there are three separate inputs 80, 81 and 82 to the modulator, each input capable of being driven independently of the other, or all at once.

The inputs can be of any desired waveform from a function generator, i.e., square, triangular, sine wave, etc. For example, the input signal can be as low as 50 millivolts or as high as 10 volts peak-to-peak without overloading the device. The frequency for each driver is dependent on its construction.

Looking at the block diagram of FIG. 8, it will be noted that two channels (Channels B and C) out of the three available channels shown have phase and pulse shaping amplifiers. The reason for this is to permit phase shift from any pulse on Channel A and also from each other; there is no need to phase shift all three of the Channels A, B and C.

If a pulse is applied only to Channel A, driver 27 would see the amplitude of the pulse and would follow faithfully the hi and low limits of the pulse on DC or the average limits of the pulse on AC, depending on the position of the TPDT (triple-pull double throw) switch 41. The modulator output would then look like the output of an ordinary rotary type chopper, the on-time and off-time strictly dependent upon the input frequency, with one great difference. Where, in an ordinary rotary type chopper there is mass inertias to overcome, input frequency changes have to be made slowly. With the present driven-type modulator, however, since there is very little inertia to overcome, the frequency of the input can change very rapidly and will be followed faithfully throughout its change.

There are three separate inputs 80, 81 and 82 which can be excited. Each input is completely independent of the other. The frequency response of each series of amplifiers, for Channels A, B and C, are identical; therefore, no particular caution has to be exercised in using the apparatus.

Input 80, 81 or 82 is excited with a pulse from a signal source, the pulse is then attenuated at the input by respective input attenuator 83, 84 or 85 to prevent overloading the next stage. The attenuator is by-passed in the event the signal is very low in amplitude at the input.

From the input attenuator, the signal is applied to a respective input preamplifier 87, 88 or 89 and driver preamplifier 91, 92 or 93, where it is amplified enough to effectively drive the next stage. When switches 96 and 95 are in the position shown in FIG. 8, the signals from driver preamplifier 92 and 93 are fed to emitter followers 98 and 99, respectively.

The signal from driver preamplifier 91 is applied directly to emitter follower 97. The function of emitter follower 97, 98 and 99 is to act as an isolation device between the power output amplifiers 101, 102 and 103 and driver preamplifiers 91, 92 and 93, respectively. The emitter followers have a gain of less than one but can reproduce the signals faithfully and without distortion.

The signal from each of the emitter followers 97, 98 and 99 are fed to the power output amplifiers 101, 102 and 103, respectively. The power output amplifiers in turn each feed a very low impedance device (i.e., drivers 27, 28 and 29, respectively) in the chopper modulator via ganged switch 41. There are two positions on switch 41 for each channel; one position applies the variations at the output of the power output amplifiers in a DC voltage mode, i.e., the variations are negative plus positive potentials and are off-set from zero by the bias at the power output amplifier. The other position of switch 41 averages the pulse and applies AC voltage to the chopper modulator. This is done by capacitive coupling of the DC pulse.

Channels B and C have phase shifting capabilities which Channel A does not have. The operation of Channel B electronics, described below, is also applicable to Channel C electronics, which has the same type of components and capabilities.

Switch 96 is switched to the lower position, the position opposite that shown in FIG. 8, if a phase difference is desired between input 80 and input 81.

The signal from driver preamplifier 92 is thus fed into the phase amplifier 111 input of phase amplifier/phase shifter circuitry via contact 112 of switch 96. Phase amplifier 111 (a solid state driver) is electronically coupled to an electro-mechanical phase shifter 113 whose output can be shifted from 0° to 180°. The output from phase shifter 113 is then applied to the input of the shaper and amplifier 115 where the signal is shaped and amplified to drive the driver preamplifier 116 and the power output amplifier 102.

The signal from driver preamplifier 116 is then fed to the input of the emitter follower 98 via line 121 and switch 96. The emitter follower 98 acts as an isolation between driver preamplifier 116 and power output amplifier 102. The output of emitter follower 98 is then fed to the input of power amplifier 102, which in turn feeds driver 28 in the Channel B input of the chopper modulator as a control for flow of energy therethrough.

The circuitry of Channel C, phase amplifier 121, phase shifter 123, shaper and amplifier 125 and driver preamplifier 126 operates the same as described above for the operation of Channel B.

As previously described, FIGS. 4, 5, 6, and 7 are graphic illustrations for purposes of demonstrating how the modulator works. The output pulse of the chopper portion of the modulator can only be seen through the use of secondary electronics and appropriate detection devices, such as the detector and amplifier of FIG. 2, for example. Pulse width is determined by the OFF period.

If a pulse is applied to Channels A and C and both pulses are 180° out of phase, time and width, the resultant pulse will be the same as exciting only one driver, instead of two. That is, the the passageway through the central aperture will close and open as if only one driver is excited, since drivers 24 and 26 are physically positioned directly opposite each other. On the other hand, if Channel A is 180° in phase, time and width with Channel C, the resultant pulse width will be twice that of the original pulse. The reason for this is that the aperture will have a tendency to stretch into a 0.008" hole, providing that both drivers are driven to the full 0.004 excursion allowed for each.

FIGS. 9 (a–e) are also merely graphic illustrations only. Any combination of pulse shapes can be developed by driving only Channels A and C at different phase and time intervals. In such cases, the amplitude will remain constant and only pulse width will change.

When a third driver (e.g. 28, Channel B) is added at right angles to the two channels, A and C, already mentioned, a different situation exists; another variable is introduced and this in effect not only provides for a change in pulse width but also an effect on amplitude.

Any number of channels can be introduced into the modulator at any angle desired, and the variations of pulses that can be accomplished by doing so are limitless. Several examples of square wave pulses produced from three or four channels is shown in FIGS. 9 (a–e). The particular pulse shape is governed by the combination of the relative motions of all the individual sliding bar apertures, which varies the amount of radiation passed through the device over a time interval. It should be noted that a square wave is produced with this modulator at lower frequencies, e.g., 1–200 cycles, as frequency is increased, the ratio of frequency versus aperture opening becomes critical and the wave tends to round out until a sine wave is produced.

Figure 10:
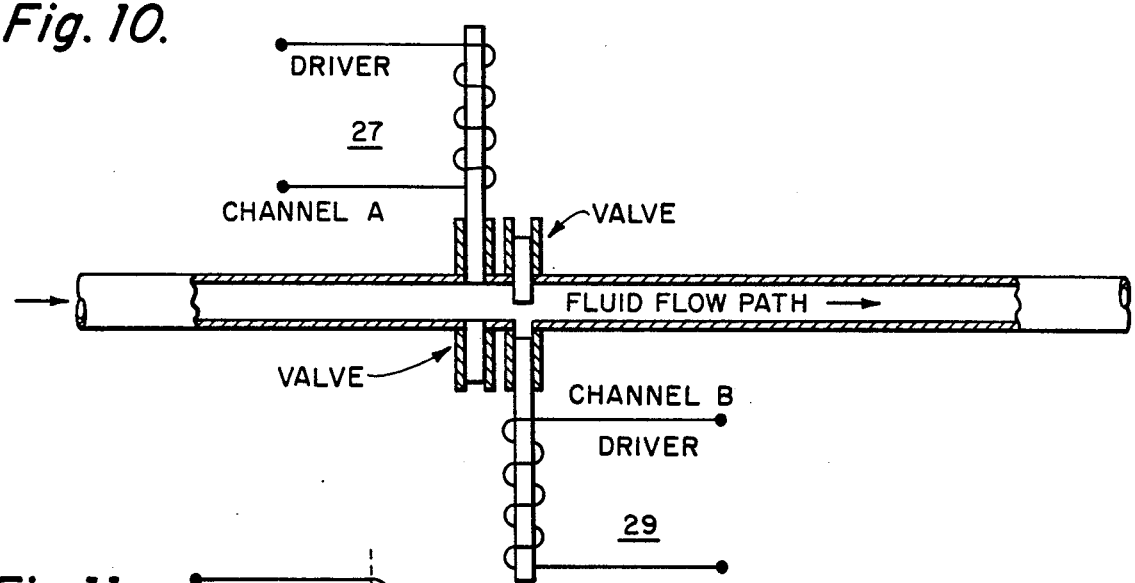
FIG. 10 is a diagrammatic illustration of an embodiment of the invention showing valves for control of fluid pressure through a pipeline.
Figure 11:
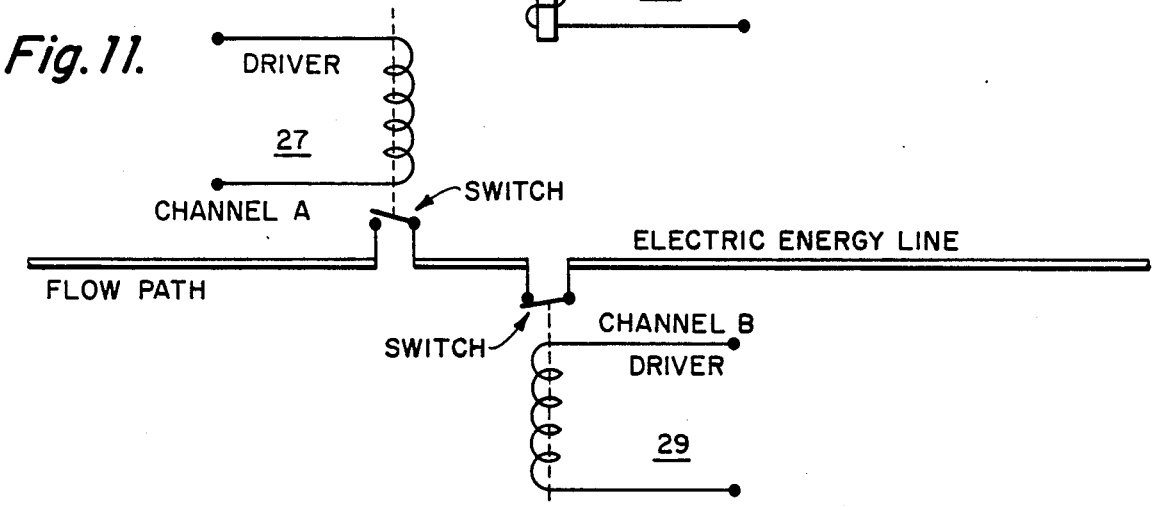
FIG. 11 is a diagrammatic illustration of another embodiment of the invention using switches to control the flow of electrical energy.
Figure 12:
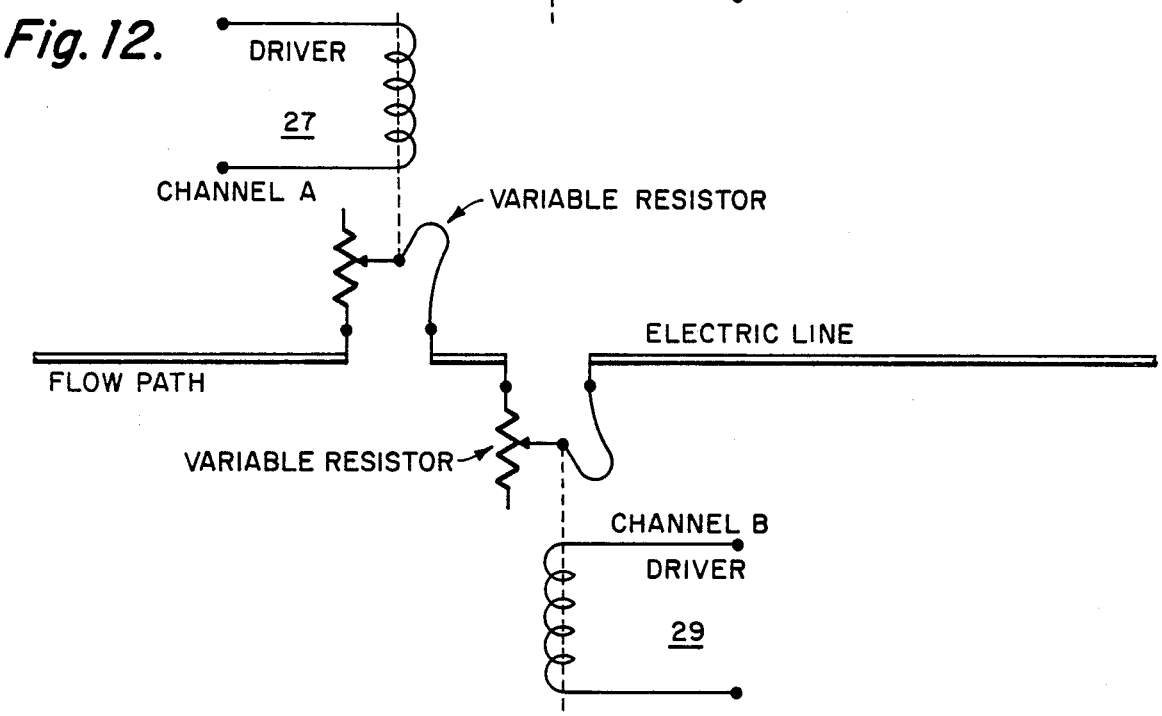
FIG. 12 is a diagrammatic illustration of a further embodiment of the system in FIG. 11 wherein variable resistors are used for modulating the flow of electrical energy.

In the chopper or energy flow control valve portion of the modulator device, instead of driving a bar with an aperture therein to be used as source modulator or chopper, the drivers can be electro-mechanical valves all feeding one energy source, which can flow through a central path at 15 in the modulator, such as fluid under pressure for an aircraft stability control system. A fluid control system is shown in FIG. 10. Also, the drivers could be electro-mechanical switches all feeding one source and can take the place of a motor for scanning on a radar system, for example. A system using electrical switches is illustrated in FIG. 11.

the drivers could be variable resistors, such as shown in FIG. 12, with the output feeding into a computer, for studies in dynamics, linear motions, etc.

Obviously many modifications and variations of the present invention are possible in light of the above teachings. It is therefore to be understood that within the scope of the appended claims the invention may be practiced otherwise than as specifically described.

I claim:

1. An electro-mechanical radiant energy source modulator comprising:
   (a) a radiant energy source;
   (b) a modulation means having a central aperture mounted in the path of a radiant energy beam from said source by which said radiant energy beam is to be modulated as it passes therethrough;
   (c) a plurality of beam modulating means mounted radially about said central aperture;
   (d) a plurality of driver means equal in number to said beam modulating means, a respective driver means connected to each one of said plurality of beam modulating means;
   (e) said driver means each being excited by sepatate respective input signals to cause each said beam modulating means to obstruct or permit said radiant energy beam to pass through said central aperture, the overall pulse shape of said radiant energy allowed to pass through said central aperture being governed by a combination of the overall action of all of said beam modulating means in response to each of said input signal operated driver means; and (f) each said beam modulating means comprising a sliding bar having an aperture therein, the center of each respective sliding bar aperture being normally aligned with said central aperture when the respective driver means connected to the beam modulating means is not excited.

2. A radiant energy modulator as in claim 1 wherein said central aperture is at least twice the diameter of said sliding bar aperture.

3. A radiant energy modulator as in claim 1 wherein each said driver means comprises a solenoid.

4. A radiant energy modulator as in claim 1 wherein said beam modulator means are positioned such that one modulator means is oriented at right angles to at least two other modulator means about said central aperture.

5. A radiant energy modulator as in claim 1 wherein the radiant energy passing through said central aperture is detected and converted to a different form of pulsed energy.

6. A radiant energy modulator as in claim 1 wherein each said beam modulating means is oscillated by said respective driver means by an amount corresponding to the amplitude and frequency of the respective input signals applied to each said driver means.

7. An electro-mechanical energy source modulator comprising:

(a) a fluid pressure energy source;

(b) a central flow-path mounted in the path of energy from said source wherein energy from said source is to be modulated as it passes therethrough;

(c) a plurality of push-pull, driver-type, electromechanical fluid energy flow modulating valve means mounted about said central flow-path, said plurality of energy modulating valve means being individually and collectively operable to control and vary the fluid energy flow from said source through said control flow-path;

(d) said energy flow modulating valve means each being responsive to separate respective input signals to cause each said push-pull, driver-type energy flow modulating valve means to obstruct or permit said fluid energy to pass through said central flow-path; any one modulating valve means having the capability to completely obstruct the flow of said fluid energy through said central flow-path; the overall pulse shape of energy allowed to pass through said central flow-path being governed by a combination of the combined action of all said fluid energy flow modulating valve means in response to each of said respective input signals.

* * * * *